March 1, 1966  R. C. STRASSER ETAL  3,237,708
AIR CUSHION CARGO HANDLING APPARATUS
Filed Oct. 12, 1962  7 Sheets-Sheet 1

INVENTORS
ROBERT C. STRASSER
ALEXANDER H. HAYNES
LAWRENCE A. SCHULTZ
BY
ATTORNEYS

March 1, 1966     R. C. STRASSER ETAL     3,237,708

AIR CUSHION CARGO HANDLING APPARATUS

Filed Oct. 12, 1962     7 Sheets-Sheet 2

INVENTORS
ROBERT C. STRASSER
ALEXANDER H. HAYNES
LAWRENCE A. SCHULTZ

BY

ATTORNEYS

INVENTORS
ROBERT C. STRASSER
ALEXANDER H. HAYNES
LAWRENCE A. SCHULTZ

BY
*Shoemaker and Mattare*
ATTORNEYS

INVENTORS
ROBERT C. STRASSER
ALEXANDER H. HAYNES
LAWRENCE A. SCHULTZ
BY
*Shoemaker and Mattare*
ATTORNEYS March 1, 1966 R. C. STRASSER ETAL 3,237,708
AIR CUSHION CARGO HANDLING APPARATUS
Filed Oct. 12, 1962 7 Sheets-Sheet 7

INVENTORS
ROBERT C. STRASSER
ALEXANDER H. HAYNES
LAWRENCE A. SCHULTZ
BY
*Shoemaker and Mattare*
ATTORNEYS United States Patent Office 3,237,708
Patented Mar. 1, 1966

3,237,708
AIR CUSHION CARGO HANDLING APPARATUS
Robert C. Strasser, Newport News, Va., Alexander H. Haynes, Anna Maria, Fla., and Lawrence A. Schultz, Hampton, Va., assignors to Newport News Shipbuilding and Dry Dock Company, Newport News, Va., a corporation of Virginia
Filed Oct. 12, 1962, Ser. No. 230,172
16 Claims. (Cl. 180—7)

The present invention relates to new and novel cargo handling apparatus, and more particularly to apparatus of this nature which utilizes the so-called "ground effect" principle whereby portable mechanisms may be supported upon a cushion of air whereupon the mechanisms can be readily moved with a minimum of effort.

The present invention is adapted for handling various types of cargo and is especially adapted for use in manually moving and handling break bulk cargo in loading and unloading ships where the apparatus is adapted to be moved over the supporting decks.

In loading ships and similar applications, it is desirable to provide apparatus which can be readily manually moved from place to place and which can be easily controlled and handled from any side of the apparatus. Accordingly, the present invention is particularly designed to provide an arrangement which can be readily maneuvered into a desired location and which further is so symmetrically arranged as to permit manipulation thereof from all sides of the apparatus with equal facility.

The apparatus of the present invention comprises a self-contained unit which is adapted to be easily connected and disconnected with an external source of energy whereupon the device can be immediately operated. The external source of energy may be connected to the apparatus of the present invention by means of an elongated flexible member such as an electric cable or a fluid line. Such elongated flexible member permits great versatility of use of the apparatus, since the apparatus may be connected with a central source of energy and then moved as desired into many varied locations.

It is also desirable that such cargo handling apparatus be provided with means whereby it may serve as a pallet in that it may be lifted and carried about by conventional fork lift trucks and the like while cargo is supported on the apparatus. Accordingly, the present invention also incorporates an arrangement whereby the apparatus can be readily moved about by a fork lift truck and the like, the apparatus being provided with suitable reinforced openings which enable the apparatus to be properly supported on the tines of such a fork lift truck whereby the device may also be moved about by a means other than its own developed power.

Since considerable amounts of cargo may be supported on the apparatus, and further since such apparatus may often be unbalanced to a certain extent, it is necessary to provide a device which is inherently quite stable and further which can accommodate a certain amount of slope in the underlying support surface as may be caused by listing of a ship. In order to provide the desired degree of stability, the apparatus of the present invention incorporates an arrangement whereby the space beneath the body means is divided into a plurality of substantially symmetrically disposed chambers which are shown as being preferably four in number, although three or more will be adequate for this purpose. The chambers are defined by a flexible peripheral confining means as well as a flexible baffle means whereby the device is adapted to move over objects and projections on a supporting surface and further which permits the apparatus to be lowered upon suitable supporting feet provided therebeneath.

Means is also provided in the central portion of the apparatus for drawing in outside air and directing such air downwardly under pressure into the chambers defined beneath the apparatus, an outlet means being associated with each of said chambers. The air is drawn in through inlet means provided in the side wall portions of the body means, and screen means is operatively associated with these openings in order to ensure that foreign matter will not enter into the gas flow producing means and possibly interfere with proper operation thereof.

An object of the present invention is to provide new and novel cargo handling apparatus which is especially adapted to be manually moved from place to place and which can be readily controlled and handled from any side thereof.

Another object of the invention is the provision of cargo handling apparatus which is completely self-contained and which can be readily connected and disconnected from an external source of energy.

A further object of the invention is to provide cargo handling apparatus including means for permitting the apparatus to be readily moved about by an external means such as a fork lift truck and the like.

A still further object of the invention is to provide cargo handling apparatus which is inherently very stable and which accommodates a certain amount of slope in an underlying surface.

Still another object of the invention is the provision of cargo handling apparatus including means for preventing foreign material from entering and interfering with the operation of the gas flow producing means of the apparatus.

Other objects and many attendant advantages of the invention will become more apparent when considered in connection with the specification and accompanying drawings, wherein:

Referring now to the drawings wherein like reference characters designate corresponding parts throughout the several views, and more particularly to FIGS. 1–10, the body means of this modification is indicated generally by reference numeral 30, the body means being constructed of a reinforced metallic construction, the various members being welded together so as to provide a strong rigid structure. The upper surface of the over-all body means serves as a load-supporting surface which is adapted to receive any suitable cargo thereon.

The body means includes a lower wall 31 which may be formed of a plurality of segments welded together, an outer side wall 32, and an inner side wall 33, each of these side wall portions also preferably being formed by segments such as four in number which are welded together. A first substantially L-shaped member 35 extends from one side of the body means to the other side thereof, and a pair of L-shaped members 36 and 37 extend substantially normally to member 35 and intersect member 35 at the central portion thereof, members 36 and 37 also extending to the side of the body means and are secured to the outer side wall portion 32.

A first substantially semicircular flat plate 40 is welded to the upper edge of inner wall portion 33 at one side of the body means, and a second similar plate 41 is secured to the upper edge of inner wall portion 33 at the opposite side of the body means to define an annular surface in the same plane as the upper legs of members 35, 36, and 37. Four flat arcuate plates 43, 44, 45 and 46 are disposed with their ends in abutting relationship and with these ends welded to one another, these plates being connected at their outer peripheries to the outer side wall portion 32 and resting upon the upper surfaces of members 40 and 41 as well as the upper surface of the horizontally extending legs of members 35, 36 and 37.

Figure 2:
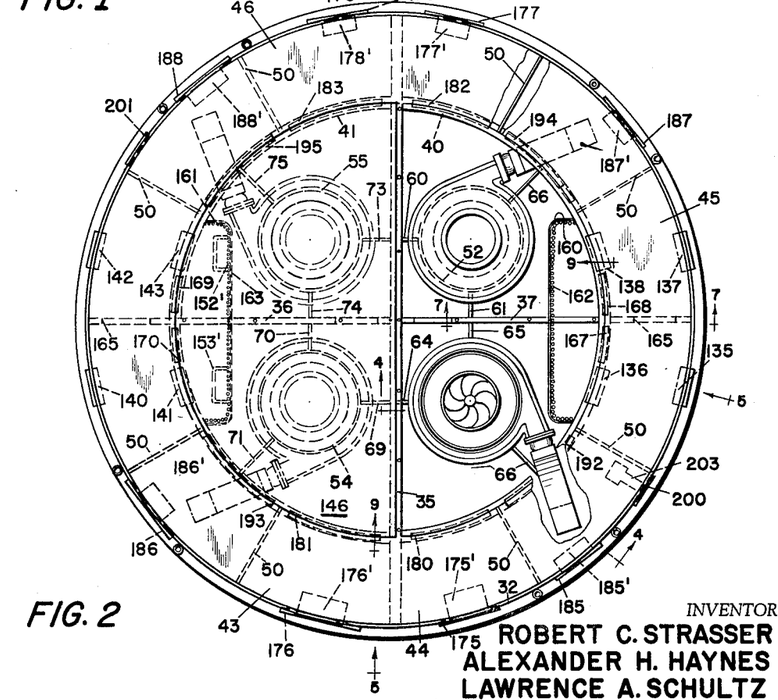
FIG. 2 is a top plan view partly broken away of the apparatus shown in FIG. 1 with one of the cover plates removed.
Figure 3:
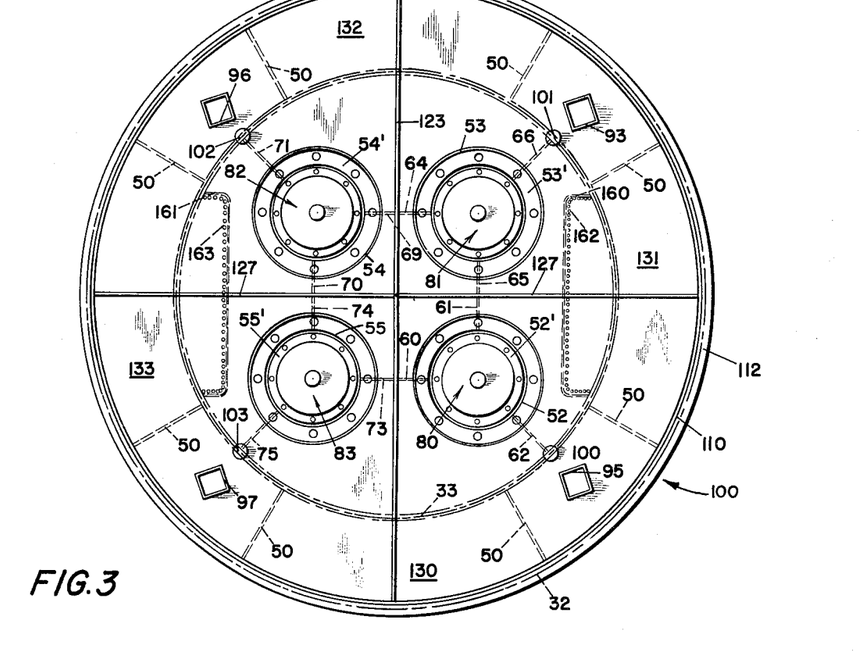
FIG. 3 is a bottom view of the structure shown in FIGS. 1 and 2.

A plurality of substantially radially extending reinforcing plates 50 extend between and are secured to the outer and inner wall portions 32 and 33 respectively as seen especially in FIGS. 2 and 3 for rigidifying the structure.

Bottom wall 31 is provided with four spaced circular openings within which are secured cylindrical members 52, 53, 54 and 55 which extend upwardly from the lower wall 31, annular mounting rings 52', 53', 54', and 55' being secured to the upper inner surfaces of cylindrical members 52, 53, 54 and 55 respectively. Cylindrical member 52 is rigidly held in position by three reinforcing members 60, 61 and 62 which extend between cylindrical member 52 and respectively members 35, 37 and the inner wall portion 33.

Cylindrical member 53 is rigidly held in position by three reinforcing members 64, 65 and 66 which extend between cylindrical member 53 and respectively members 35, 37 and the inner wall portion 33.

Cylindrical member 54 is rigidly held in position by three reinforcing members 69, 70 and 71 which extend between cylindrical member 54 and respectively members 35, 37 and the inner wall portion 33.

Cylindrical member 55 is rigidly held in position by three reinforcing members 73, 74 and 75 which extend between cylindrical member 55 and respectively members 35, 37 and the inner wall portion 33.

Figure 4:
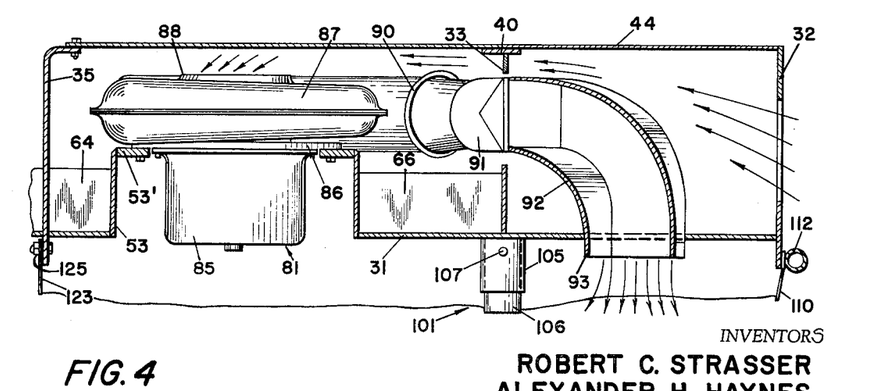
FIG. 4 is a sectional view taken substantially along line 4—4 of FIG. 2 looking in the direction of the arrows.
Figure 5:
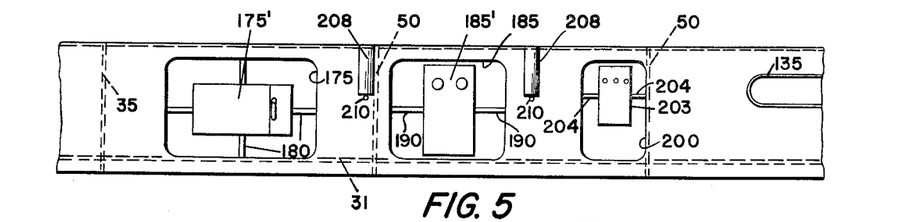
FIG. 5 is a broken away view looking in at the side of the structure shown in FIG. 2 and taken substantially along line 5—5 looking in the direction of the arrows.
Figure 6:
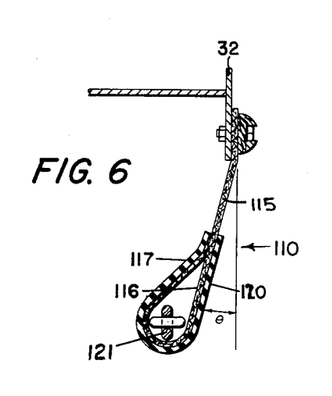
FIG. 6 is an enlarged broken away view illustrating the mode of construction of the peripheral confining means.

Supported by each of the mounting rings 52', 53', 54' and 55' is a motor blower combination for producing a flow of air downwardly beneath the apparatus. These motor blower combinations in general are indicated by reference numerals 80, 81, 82 and 83. These arrangements are all identical and accordingly, a description of one of these arrangements will suffice for all. As seen in FIG. 4, motor blower combination 81 includes an electric motor 85 secured to a mounting flange 86 which is bolted to the mounting ring 53'. A blower 87 which may be of a well-known conventional centrifugal type is indicated generally by reference numeral 87 and is of course drivingly connected with motor 85. The inlet to the blower is at the top thereof as indicated by reference numeral 88 and the arrows indicate the manner in which the air is sucked into the inlet of the blower. The outlet of the blower is indicated generally by reference numeral 90 and is connected through a flexible connected means 91 with a conduit means 92 which in turn terminates in an outlet 93 which is directed downwardly and extends slightly beneath the lower wall 31 of the apparatus. It is evident that operation of the motor blower will produce a flow of air downwardly beneath the apparatus. It will be understood that portions 91 and 92 extend through suitable openings provided in the inner wall portion 33 and the lower wall 31 of the apparatus.

Referring to FIG. 3, it will be seen that the outlet 93 for motor blower 81 is substantially square in configuration and is disposed adjacent the outer periphery of the apparatus. The motor blower arrangements 80, 82 and 83 are identical with that shown in FIG. 4, and as seen in FIG. 3, it will be noted that outlets 95, 96 and 97 of the other motor blowers are oriented in a manner similar to that of outlet 93, being disposed adjacent the outer periphery of the apparatus and the various outlets being spaced angularly approximately 90° with respect to one another.

As seen particularly in FIG. 3, the under surface of the apparatus is provided with four spaced feet 100, 101, 102 and 103, each of these feet being constructed in the manner illustrated in FIG. 4, wherein foot 101 includes a downwardly extending cylindrical portion 105 which is secured at its upper end to the lower wall 31 of the apparatus, member 105 being formed of steel or the like and receiving therein a hardened rubber insert or similar resilient member 106, member 106 being retained in position by a suitable cross pin 107 extending through aligned openings in members 105 and 106. These feet are adapted to support the apparatus in a position elevated from an underlying supporting surface in the absence of an air cushion under the apparatus.

The apparatus is provided with a depending peripheral confining means in the form of a skirt which is indicated generally by reference numeral 110, the upper portion of this skirt being retained in operative position by being clamped between a bumper 112 and the outer wall portion 32 of the apparatus. Bumper 112 may be formed of any suitable substance such as wood and the like which is adapted to prevent injury to the outer wall portion of the apparatus, the bumper being suitably secured in position as by bolting it to the outer wall portion. As seen especially in FIG. 6, skirt 110 includes a depending piece of material 115 which may be formed of a suitable flexible substance such as canvas or the like, this material being doubled back on itself to form a loop 116 at the lower end thereof and stitched along a line 117. The outer surface of portion 115 is preferably inclined somewhere between a directly vertical direction and an inwardly sloping direction so as to define an angle theta somewhere between 0° and 15°. This loop portion is surrounded by a layer of substance 120 which is adapted to resist excessive wear and which may comprise a suitable elastomeric substance such as neoprene rubber or the like. A suitable weight preferably in the form of a flexible chain or the like 121 is disposed within loop portion 116 so as to normally hold the lower portion of the depending skirt close to the underlying surface to prevent excessive escape of air from the space beneath the apparatus. The depending skirt does not actually engage the underlying surface during normal operation, but a small air gap remains between the skirt and the ground to allow for the escape of air and may be on the order of approximately 0.25 inch. At the same time, the inherent resilience and flexibility of the skirt portion allows it to accommodate variations in the contour of the underlying surface and also to move over external objects which may be encountered.

As seen particularly in FIGS. 3 and 4, a depending divider skirt 123 is constructed similarly to the peripheral confining skirt 110, divider skirt 123 being secured at the upper end thereof to a depending portion of member 35 by means of a retainer strip 125 which is bolted to the depending portion of member 35.

Divider skirt 123 extends completely across the lower periphery of the apparatus as seen in FIG. 3. A pair of divider skirts 127 are constructed similarly to divider skirt 123, divider skirts 127 being secured to depending portions of members 36 and 37 respectively by means of retainer strips 128, divider skirts 127 cooperating with divider skirt 123 as seen in FIG. 3 to form baffle means which in combination with the peripheral skirt 110 defines four chambers indicated by reference numerals 130, 131, 132 and 133 respectively, each of these chambers substantially defining a quadrant of a circle with the four outlets 93, 95, 96 and 97 each being disposed within one of these chambers. It will be seen that the chambers are substantially symmetrically disposed at the under surface of the apparatus, and that the outlets are symmetrically disposed therewithin.

In order to permit the device to be lifted and moved while not under its own power, fork lift tine receiving portions are provided. Fork lift receiving openings are provided at opposite portions of the apparatus, and as seen especially in FIG. 2, a first pair of reinforced openings 135 and 136 are provided in the inner and outer wall portions of the apparatus for receiving a first tine while a second pair of aligned reinforced openings 137 and 138 are provided in the outer and inner wall portions respectively for receiving a second tine. In a similar manner, reinforced openings 140, 141, 142 and 143 are provided at opposite portions of the outer and inner walls for receiving fork lift tines. These reinforced openings are formed by providing openings in the inner and outer wall portions, and disposing annular plates within the openings which extend a substantial distance laterally of the openings so as to more readily support the load of the apparatus on a fork lift tine.

Figure 8:
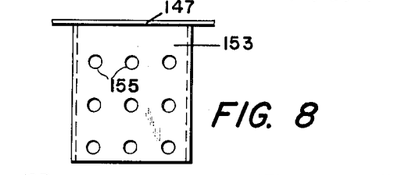
FIG. 8 is a view illustrating a stop member on one of the cover plates.
Figures 9, 10, 11:
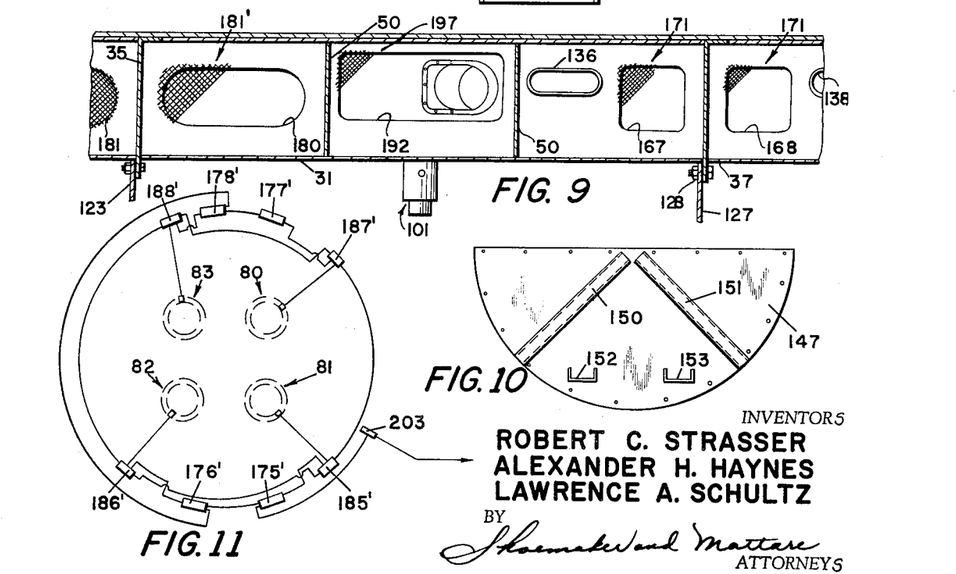
FIG. 9 is a sectional view taken substantially along line 9—9 of FIG. 2 looking in the direction of the arrows.
FIG. 10 is a bottom view of one of the cover plates.
FIG. 11 is a schematic wiring diagram of the electrical connections incorporated in the structure of this modification.

A pair of cover plates 146 and 147 are provided for covering the central opening provided in the apparatus, these cover plates being adapted to be bolted to the upper surfaces of members 35, 40 and 41. As seen in FIG. 10, cover member 147 is provided with a pair of diagonally extending reinforcing members 150 and 151 secured to the under surface thereof, and a pair of depending tine stop members 152 and 153 are also secured to the under surface of the cover plate and extend therefrom. As seen in FIG. 10, each of these stop members 152 and 153 may be substantially U-shaped cross-sectional configuration and as seen in FIG. 8, an enlarged view of stop member 153 is shown wherein it is seen that the stop surfaces of each of these stop members is provided with a plurality of openings 155 formed therethrough for permitting ready circulation of air through these tine stop members. It will be understood that the construction of cover plate 146 is identical with that of cover plate 147 and cover plate 146 is shown in FIG. 2 in operative position wherein the depending tine stop members 152' and 153' thereof are in position to engage and limit inward movement of fork lift tines which may project through the aligned openings 142, 143 and 140, 141. In order to prevent undesired entry of foreign matter through the tine receiving openings, channel members 160 and 161 as seen in FIG. 2 extend inwardly from the inner wall portion of the apparatus, and wire mesh screens 162 and 163 respectively are secured to and depend from these channel portions so as to prevent any large foreign matter from passing inwardly into the intake openings of the blowers of the apparatus.

Figure 7:
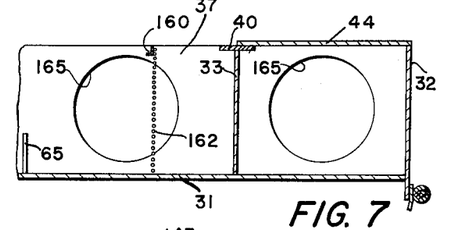
FIG. 7 is a sectional view taken substantially along line 7—7 of FIG. 2 looking in the direction of the arrows.

The manner in which screen 162 is supported from channel member 160 can be seen most clearly in FIG. 7, wherein it will be seen that the screen extends throughout the height of the apparatus. In addition, as seen in this figure it will be noted that member 37 may be provided with lightening holes 165 so as to reduce the over-all weight of the apparatus. Air inlet openings 167, 168, 169 and 170 are provided in the inner wall portion 33 of the apparatus and serve to permit the entry of air into the interior of the apparatus, each of these openings being covered with a suitable wire mesh screen or the like as indicated by reference numerals 171 in FIG. 9 so as to prevent the undesired entry of foreign matter through these openings.

Figure 1:
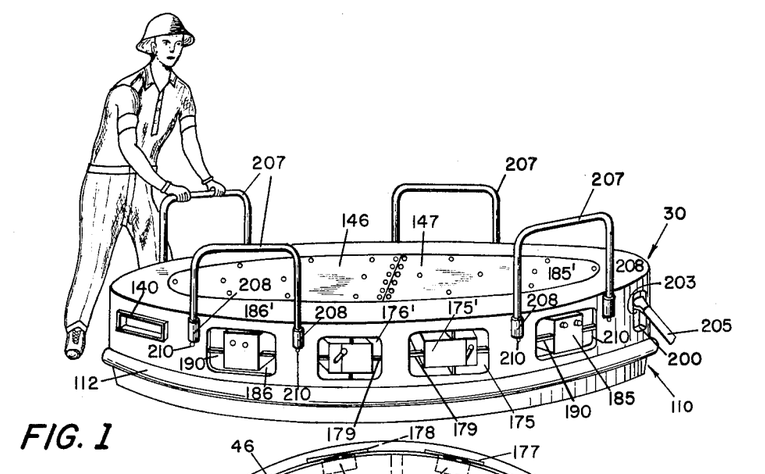
FIG. 1 is a top perspective view of a first modification of the present invention illustrating the manner in which it can be moved from place-to-place.

The outer wall portion 32 is provided with four spaced openings 175, 176, 177, 178 as seen particularly in FIGS. 1 and 2, and disposed within each of these openings is a circuit breaker, these circuit breakers being indicated by reference numerals 175', 176', 177', and 178' respectively. As illustrated in FIG. 1, these circuit breakers may be mounted centrally within these openings by a plurality of arms 179, whereby the circuit breakers permit air to flow past and over the surfaces thereof so as to effectively cool the circuit breakers during operation. Openings 180, 181, 182 and 183 are formed through the inner wall portion 33 of the body means radially inwardly of openings 175, 176, 177 and 178 respectively, each of these openings being covered by a suitable wire mesh screen means as indicated by reference numeral 181' in FIG. 9.

Four openings 185, 186, 187 and 188 are provided through the outer wall portion 32, and electrical controllers 185', 186', 187' and 188' mounted respectively within openings 185, 186, 187 and 188, these electrical controllers being supported in the central portion of these openings by means of arms 190. The mounting of the controllers is such that the air may flow through the respective openings past the controllers and thereby serves to effectively cool the controllers during operation of the apparatus.

Openings 192, 193, 194 and 195 are formed through the inner wall portion 33 radially inwardly of openings 185, 186, 187 and 188 respectively, openings 192, 193, 194 and 195 being provided with a wire mesh screen means as indicated by reference numeral 197 in FIG. 9, openings 192 also providing a space through which the outlet conduit of the blowers extends and of course permitting further flow of air inwardly to supply the blowers.

A pair of openings 200 and 201 are also provided through outer wall portion 32, an electrical receptacle 203 being supported within opening 200 by means of arms 204, this receptacle being adapted to be connected with a flexible electrical cable as indicated by reference numeral 205 in FIG. 1.

Referring to FIG. 11, a wiring diagram illustrates schematically the electrical connections between the electrical receptacle, the circuit breakers 175', 176', 177', and 178', the controllers 185', 186', 187', and 188', and the motor blower mechanisms 80, 81, 82 and 83.

The electrical arrangement is such that a suitable electrical connector is plugged into the receptacle and then starting any motor by means of the associated controller automatically starts the remaining three motors. In a similar manner, when it is desired to discontinue operation of the blowers it is merely necessary to operate the handiest controller so as to stop use of all of the motor blower mechanisms.

As shown in FIG. 1, four substantially U-shaped tubular handles are indicated by reference numerals 207, the lower ends of these handles fitting within tubular members 208 secured to the outer surface of the outer wall portion of the body means, small bars 210 being secured across the lower open ends of tubular members 208 to limit downward movement of the lower ends of the handles within these tubular members. It is apparent that the handles provide a means for readily manually manipulating the apparatus when the motor blower mechanisms are operating such that the device is supported on the cushion of air, and the handles may, of course, be readily removed when desired.

Figure 12:
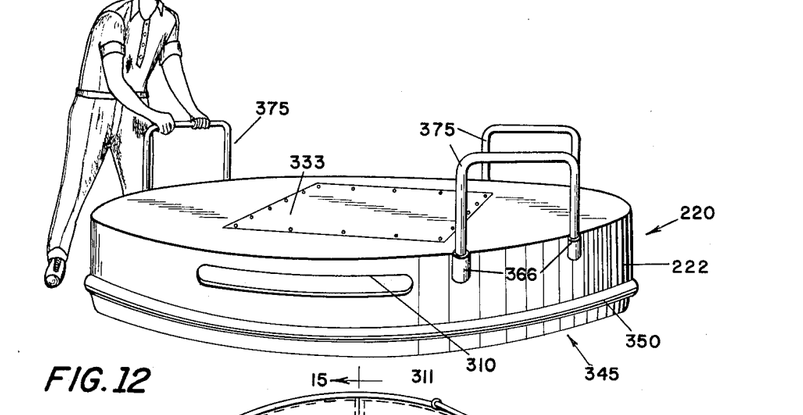
FIG. 12 is a top perspective view of a modified form of the invention.

Referring now to FIGS. 12–22 of the drawings, a second modification is illustrated. In this modification, the body means as seen in FIG. 12 is indicated generally by reference numeral 220, the body means including an annular outer wall portion 222 which may for example comprise four equal sections which are welded together. The cross framework of the body means includes a pair of channel members 227 and 228 extend normally from chamber member 224 and are secured to the inner surface of the outer wall portion 222. A similar pair of channel members 230 and 231 are secured to and extend normally from channel member 225 and are secured to the inner surface of the outer wall portion. A further pair of channel members 234 and 235 are connected between channel members 224 and 225 in alignment with channels 227, 230 and 228, 231 respectively.

A member 240 having a flange at the lower end thereof is secured between channel 224 and the inner surface of outer wall portion 222 and a similar flanged member 241 is secured by the channel member 225 and the inner surface of outer wall portion 222.

The top surface of the apparatus is defined by a pair of top plates 245 and 246 which are welded together along lines 247 and 248, these plates being cut out so as to cooperatively define between them a substantially square access opening. In order to reinforce the over-all body structure and make it as rigid as possible a number of reinforcing members are provided.

Four reinforcing members 250, 251, 252 and 253 are secured to the under surface of the top plates and extend between the points of intersection of members 224, 227; 225, 230; 225, 231; and 224, 228 respectively to the adjecent inner surface of the outer wall portion of the body means. Four reinforcing members 255 have one end thereof secured to flange member 240, these reinforcing members also being secured to the under surface of plate 245 and extending to the corners of the respective spaces as will be clearly seen in FIG. 13. In a similar manner, four reinforcing members 256 are secured to the under surface of plate 247 between flange member 241 and the corners of the spaces thereabout as will be clearly seen. A reinforcing member 260 extends from one end of channel member 224 diagonally across the space between this channel member and channel member 225 and has the opposite end thereof secured to channel member 225. A pair of reinforcing members 261 and 262 extend between reinforcing member 260 and the corners of the surrounding space, all of these reinforcing members being secured to the under surfaces of the respective top plates. In a similar manner a reinforcing member 264 extends from the opposite end of channel member 224 diagonally across its associated space and has the opposite end thereof secured to channel member 225. A pair of reinforcing members 265 and 266 have one end thereof secured to reinforcing member 264 with the opposite ends thereof secured to channel members 224 and 225 in the corners of the respective spaces, these latter reinforcing members also being secured to the under surface of the respective top plates. It is apparent that the above described reinforcing means in cooperation with the various channel and flange members provides a very rigid over-all structural arrangement which is well adapted to support heavy loads.

Figure 13:
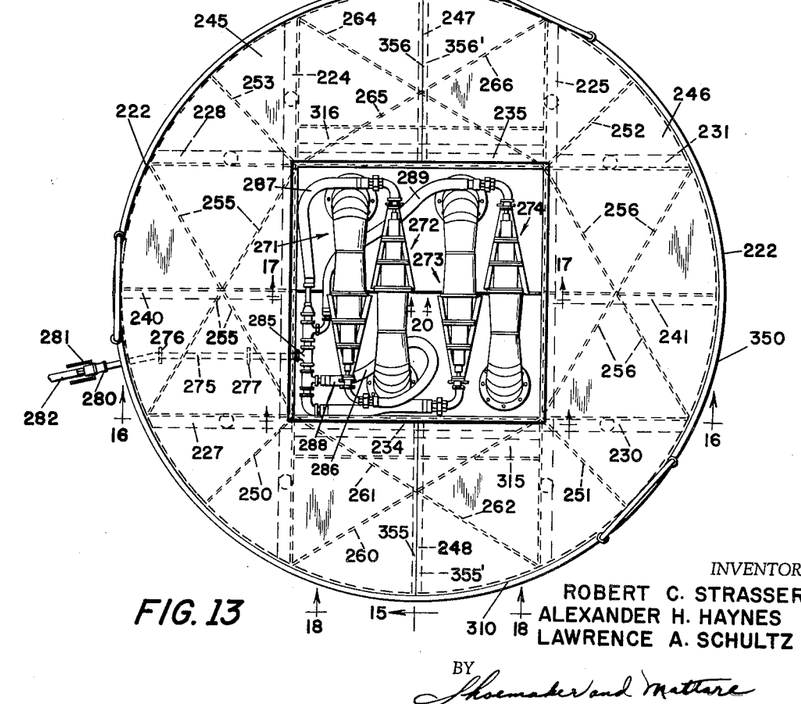
FIG. 13 is a top view of the structure shown in FIG. 12 with the cover plate removed.
Figure 14:
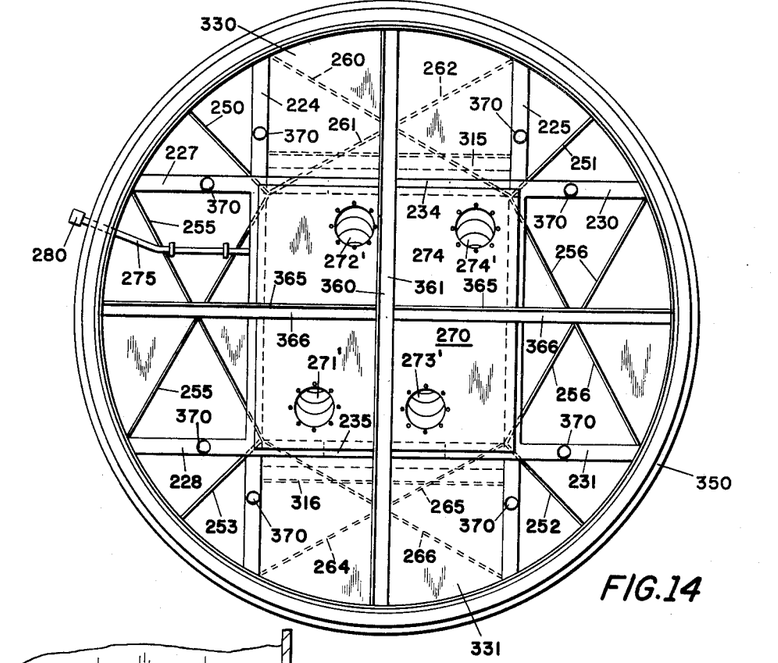
FIG. 14 is a bottom view of the apparatus shown in FIGS. 12 and 13.
Figures 15, 17, 18:
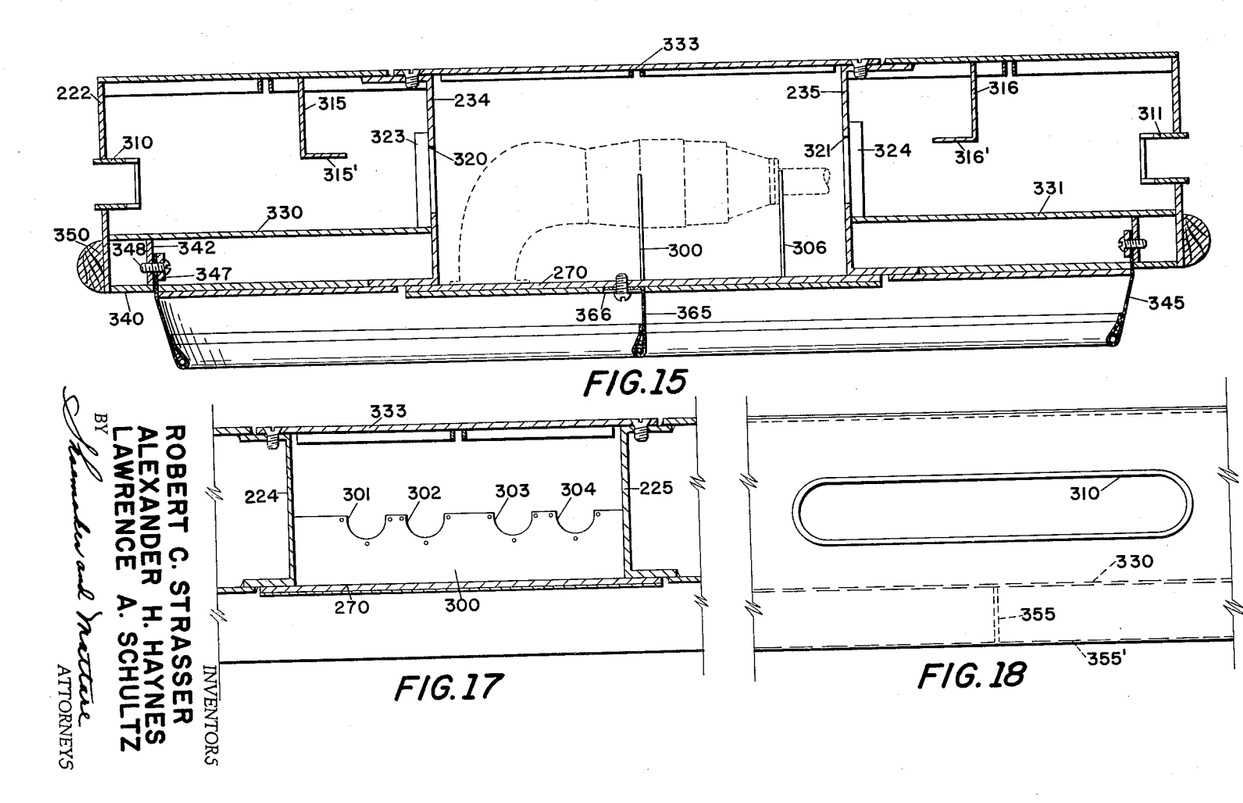
FIG. 15 is a sectional view taken substantially along line 15—15 of FIG. 13 looking in the direction of the arrows.
FIG. 17 is a sectional view taken substantially along line 17—17 of FIG. 13 looking in the direction of the arrows with portions of the structure removed for the sake of illustration.
FIG. 18 is a view looking in at the side of the structure shown in FIG. 13, and taken substantially along line 18—18 looking in the direction of the arrows.

As seen particularly in FIG. 15, a bottom plate 270 is suitably secured as by welding to the lower flanges of members 224, 225, 234 and 235. This bottom plate serves to support the gas flow producing means which in the present case takes the form of four conventional eductors indicated generally by reference numerals 271, 272, 273 and 274 as seen in FIG. 13. These eductors are of a conventional construction and may for example be commercial items identified as SK Blast Nozzles, manufactured by Schutte and Koerting Co., Cornwells Heights, Bucks County, Pa. As seen in FIG. 13, an inlet conduit 275 is supported by brackets 276 and 277 from the under surface of plate 245 and extends outwardly of the body means to a fitting 280 which is adapted to be connected by quick disconnect fitting 281 to a fluid line 282 which may be connected with any suitable source of pressure such as an external motor-compressor unit. Conduit 275 fits into a manifold 285 which in turn is connected by means of fluid lines 286, 287, 288 and 289 to the eductors 271, 272, 273 and 274 respectively. As seen in FIG. 14, bottom plate 270 is provided with discharge openings 271', 272', 273' and 274' for the eductors 271, 272, 273 and 274 respectively.

It will be noted that these discharge outlets are disposed substantially symmetrically with respect to the overall body means.

Referring again to FIGS. 15 and 17, a plate 300 is secured to the upper surface of bottom plate 270 and extends upwardly therefrom, plate 300 being provided with four substantially semi-circular recesses 301, 302, 303 and 304 in the upper edge thereof, these recesses being adapted to receive portions of the eductors for supporting the eductors in operative position. In addition separate support members 306 as shown in FIG. 15 may be provided for supporting additional portions of the eductors to ensure that they are securely mounted in proper position.

Opposite sides of the outer wall portion 222 are provided with reinforced inlet openings, the outer wall portion having suitable openings provided therethrough within which are secured annular reinforcing means 310 and 311 which are seen most clearly in FIG. 15.

These reinforced inlet openings are adapted to receive fork lift tines when it is desired to lift the apparatus with a fork lift truck and the like. In order to enable the fork lift tines to effectively lift the device, additional flange members 315 and 316 are secured to the under surface of the top plates and extend in a direction substantially parallel with openings 310 and 311 whereby the fork lift tines when inserted in the openings defined by 310 and 311 will engage the lower flange portions 315' and 316' of members 315 and 316 respectively.

Channel members 234 and 235 are provided with openings 320 and 321 respectively which provide communication with the eductor chamber, these openings being covered by a series of protective bars 323 and 324 respectively for preventing the entrance of undesired foreign matter into the eductor chamber.

Figure 21:
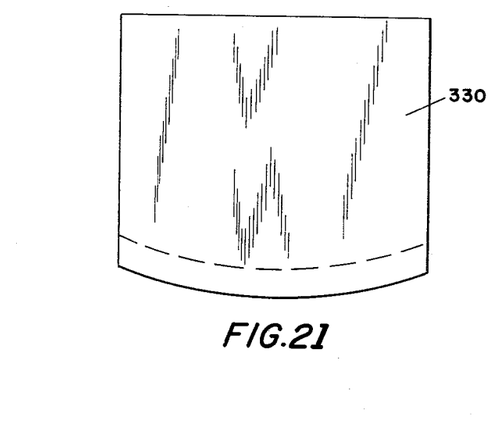
FIG. 21 is a top view of the duct cover employed in this modification.

A first plate 330 having a plan configuration as shown in FIG. 21 is disposed in the space between channel members 224 and 225 and 234 and the inner surface of the outer wall portion, this plate serving to define the bottom wall of a duct leading from the exterior of the apparatus into the eductor chamber. A similar plate member 331 is disposed in the space defined between channel members 224 and 225 and 235 and the inner surface of the outer wall portion for a similar purpose.

Figure 22:
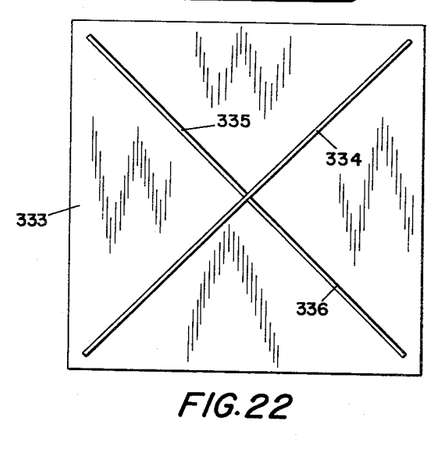
FIG. 22 is a bottom view of the cover plate utilized in the second modification.

A cover plate 333 as seen in FIG. 22 is substantially square in plan outline and has provided on the under surface thereof a first reinforcing member 334 extending to points adjacent opposite diagonal corners thereof, a pair of reinforcing members 335 and 336 being disposed between reinforcing members 334 and points adjacent to the other diagonal corners of the cover plate.

Cover plate 333 is adapted to be bolted to the upper flanged portions of channel members 224, 225, 234 and 235. It is evident that this cover plate may be removed whenever it is desired to gain access to the eductors.

Figure 19:
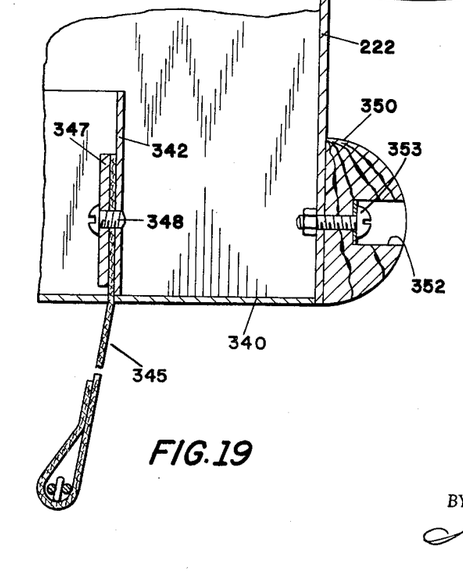
FIG. 19 is an enlarged view illustrating certain details of the structure shown in FIG. 16.
Figure 20:
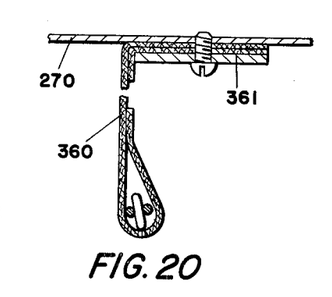
FIG. 20 is a sectional view taken substantially along line 20—20 of FIG. 13 looking in the direction of the arrows.

As seen most clearly in FIG. 19, a bottom ring means 340 which may be formed in four quarter sections forms an annular ring about the lower inner portion of the body means, and an upwardly directed inner rim means 342 which may also be formed in four quarter sections for simplicity of application extends upwardly from the ring means 340 completely around the apparatus.

This inner rim means serves as a mounting means for the peripheral confining means or skirt which is indicated generally by reference numeral 345 and may be of the same general construction as the skirt means 110 described in connection with the first modification. Skirt means 345 may be retained in operative position by means of an annular retaining ring 347 which may be made in as many sections as desirable and secured in operative position by means of bolts 348 which serve to clamp the skirt means between the retaining ring 347 and the inner rim means 342. In this manner, the skirt means 345 is supported completely acround the lower outer peripheral portion of the apparatus to operate in the same manner as the skirt means previously described.

Also as seen in FIG. 19, this form of the invention may be provided with a bumper 350 which may be made of wood or any suitable substance, this bumper being provided with recessed openings 352 within which are disposed bolts 353 for securing the bumper in operative position completely around the outside of the body means.

Figure 16:
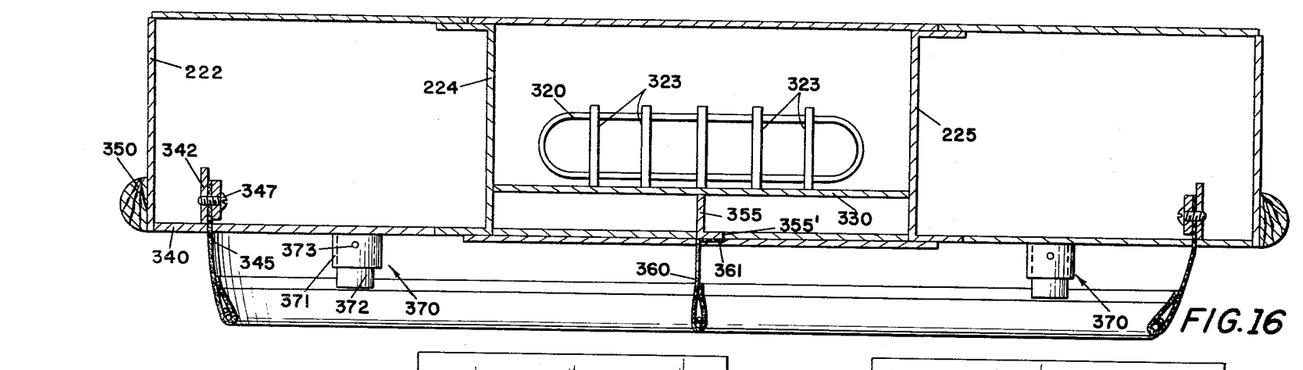
FIG. 16 is a sectional view taken substantially along line 16—16 of FIG. 13 looking in the direction of the arrows.

As seen in FIGS. 13 and 16, a member 355 is secured to the under surface of plate 330 and is provided at the lower edge thereof with a laterally extending flange 355'. A similar flanged member 356 is provided with a flange 356' at the lower end thereof, member 356 being secured to the under surface of plate 331. A first divider skirt 360 which may have the same construction as the divider skirt previously described is secured by means of retainer means 361 to the lower flanges 355', 356' of members 335 and 356 as well as to the under surface of bottom plate 270, divider skirt 360 extending completely across the under surface of the apparatus.

The upper portion of divider skirt 360 is clamped between the retainer means 361 and the respective members with retainer means 361 being suitably secured to these members as by bolts and the like. A pair of divider skirt means 365 which are constructed similarly to the previously described divider skirt means extend substantially normally to divider skirt 360, divider skirt means 365 being secured to the under surface of bottom plate 270 and the under surface of flange members 240 and 241 and being secured thereto by suitable retainer means 366 which is connected as by bolting to the respective members.

Again in this modification it will be apparent that divider skirt means 360, 365 and 366 serve as baffle means to divide the under surface of the apparatus into four substantially symmetrically disposed chambers, and that each of the outlets from the various eductors is in communication with one of such chambers. A plurality of feet shown as being 8 in number and indicated by reference numerals 370 are secured to the under surfaces of channel members 224, 225, 227, 228, 230, 231 for supporting the apparatus above a supporting surface when not supported upon a cushion of air. As seen in FIG. 16, each of these feet 370 includes a tubular member 371 within which is disposed a suitable resilient insert 372 which may be formed for example of hard rubber and the like, the insert being held in position by means of a pin or the like 373 extending in aligned openings formed in the tubular member and the insert.

As seen in FIG. 12, this modification is provided with three substantially U-shaped tubular handle members 375 which are received by fittings 366 identical with the fittings described in connection with the previous modification whereby the handles may be readily inserted and removed as desired.

It is evident that in this last-mentioned modification, the device will be operative when fluid pressure is introduced to the eductors through fitting 280. In order to facilitate operation of the device, a foot operated quick opening valve may be installed adjacent fitting 280 such that a workman can readily connect and disconnect a source of power to the eductors simply by operating such valve with his foot.

It is apparent from the foregoing that there is provided new and novel cargo handling apparatus which is especially adapted to be manually moved from place to place and which can be readily controlled from any side thereof due to the fact that handle means is readily available therearound.

In addition, the control means for initiating and discontinuing operation of the gas flow producing means is readily controlled from a point adjacent the apparatus. The apparatus provides a completely self-contained unit except for the external source of energy and the device may be readily connected and disconnected from such external source whereupon it may be readily moved about under other power as by a fork lift truck, the tines of which are particularly adapted to be received within certain reinforced opening means provided in the apparatus. The arrangement is such that the apparatus is quite stable and can accommodate a certain amount of slope of the underlying surface.

Means is also provided for preventing the entry of foreign material into the interior of the apparatus which otherwise might interfere with operation of the flow producing means.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. Cargo handling apparatus comprising a relatively rigid body means including a load supporting surface, a flexible skirt confining means supported adjacent the periphery of said body means and extending downwardly therefrom and completely therearound forming a chamber therebeneath, flexible skirt baffle means supported by said body means and extending downwardly therefrom and diagonally thereacross so as to divide the space between said body means into a plurality of chambers, said body means having peripheral compartments above said chambers and peripheral side walls with air inlet openings formed therein in communication with said compartments, means supported in the central portion of said body means for drawing air in through said air inlets, said last-mentioned means including conduits having downwardly directed outlets in communication with each of said chambers for discharging air downwardly into said chambers.

2. Apparatus as defined in claim 1, wherein a separate one of said outlets is in communication with each separate one of said chambers.

3. Cargo handling apparatus comprising a relatively rigid body means having a load supporting surface, flexible skirt confining means supported by the lower outer peripheral portion of said body means and depending therefrom, flexible skirt baffle means extending across and supported by the under portion of said body means and dividing the space beneath said body means into a plurality of chambers, said body means having compartments above said chambers and side wall portions having air inlet openings formed therethrough in communication with said compartments, said side wall portions also including reinforced areas for receiving fork lift tines and the like, means supported by the central portion of said body means to produce fluid flow into said chambers, said last-mentioned means including conduits having downwardly directed outlets, one outlet being in communication with each of said chambers for discharging fluid downwardly into the associated chamber.

4. Cargo handling apparatus comprising a rigid reinforced body means having a load supporting surface, flexible skirt confining means supported adjacent the periphery of said body means and depending therefrom, a plurality of flexible skirt baffle members extending across and supported from the under surface of said body means, said baffle members extending at an angle with respect to one another so as to divide the space beneath the body means into a plurality of chambers, said body means including side wall portions, said body means having compartments above said chambers and air inlet openings formed therethrough opening into said compartments, screen means associated with said air inlet openings to prevent entry of foreign matter through said air inlet openings, means supported by the central portion of said body means to produce fluid flow into said chambers, said last-mentioned means including conduits having downwardly directed outlets, one outlet being disposed in communication with each of said chambers for directing fluid flow downwardly into the associated chamber.

5. Apparatus as defined in claim 4, wherein said side wall portions are provided with reinforced areas for receiving fork lift tines and the like.

6. Apparatus as defined in claim 4, including handle means removably supported by said body means for facilitating manual movement of the body means when supported upon a cushion of air.

7. Apparatus as defined in claim 4, including supporting feet extending downwardly from the under surface of said body means for supporting the body means in spaced relationship to an underlying surface in the absence of an air cushion.

8. Apparatus as defined in claim 4, including a bumper means extending completely around the outer surface of said body means for protecting the body means against injury by accidental contact with external objects.

9. Cargo handling apparatus comprising a relatively rigid reinforced body means having a load supporting surface, said body means including side wall portions, handle means removably supported by at least one of said side wall portions, said side wall portions having air inlet openings formed therethrough opening into compartments beneath said surface and also having reinforced areas for receiving fork lift tines and the like, screen means supported adjacent said openings for preventing entry of foreign matter through said openings, a flexible skirt confining means supported about the lower outer peripheral portion of said body means and depending therefrom, a pair of flexible skirt baffle means extending across and supported from the under surface of said body means for dividing the space beneath said compartments into a plurality of substantially symmetrically disposed chambers, supporting feet supported by said body means and depending therefrom for supporting the body means above a supporting surface in the absence of an air cushion therebeneath, means supported in the central portion of said body means for producing fluid flow into said chambers, said last-mentioned means including conduits having downwardly directed outlets, one outlet being in communication with each of said chambers.

10. Apparatus as defined in claim 9, wherein said outlets are disposed symmetrically with respect to said body means.

11. Apparatus as defined in claim 9 including bumper means extending completely around said body means and protecting said body means against accidental contact with external objects.

12. Cargo handling apparatus comprising a substantially rigid body means having a load supporting surface, flexible skirt confining means supported adjacent the outer peripheral portion of said body means and depending therefrom, flexible skirt baffle means supported from and extending across the under surface of said body means for dividing the space beneath the body means into a plurality of chambers, said body means having side wall portions, said side wall portions having air inlet openings formed therethrough opening into compartments located above said chambers, means supported at the central portion of said body means for drawing air through said air inlet means and discharging air downwardly within each of said chambers, said last-mentioned means including a plurality of discharge conduits having downwardly directed outlets, one of said conduits outlets being in communication with each of said chambers, said air outlets being disposed through the outer periphery of said body means and being substantially equally angularly spaced from one another.

13. Apparatus as defined in claim 12, wherein said means for producing fluid flow into said chambers comprises electrically operated blowers and electrical control means for said blowers, said control means being disposed adjacent at least one of said air inlet openings such that air drawn into the associated openings serves to cool the control means.

14. Apparatus as defined in claim 12, wherein said side wall portions includes reinforced areas for receiving fork lift tines and the like.

15. A cargo handling apparatus comprising a body means having a load supporting platform, a peripheral side wall, bottom wall, and reinforcing plates defining with said platform peripheral compartments, flexible skirt sealing means depending from said body adjacent the lower edge of the peripheral side wall and forming said bottom wall a pressure chamber, diagonal walls and flexible skirt baffle means dividing said chamber into a plurality of chambers, fluid pressure producing means having inlet and outlet openings mounted beneath the supporting platform, discharge ducts leading from the outlet opening of said pressure producing means into said compartments and opening downwardly through the said bottom wall into each of said chambers.

16. The cargo handling apparatus of claim 15, wherein said peripheral wall has fluid inlet openings opening into said compartments, and the inlet opening of said pressure producing means being in communication with said compartments.

References Cited by the Examiner

UNITED STATES PATENTS

| | | | |
|---|---|---|---|
| 2,410,373 | 10/1946 | Westernelt | 214—620 |
| 2,751,038 | 6/1956 | Acheson | 180—7 X |
| 2,820,561 | 1/1958 | Meagher | 124—620 |
| 2,922,277 | 1/1960 | Bertin | 180—7 |
| 2,938,590 | 5/1960 | Barnett | 180—7 |
| 2,953,321 | 9/1960 | Robertson et al. | 180—7 |
| 3,027,860 | 4/1962 | Priest | 180—7 |
| 3,055,446 | 9/1962 | Vaughen | 180—7 |
| 3,078,938 | 2/1963 | Bollum | 180—7 |
| 3,078,940 | 2/1963 | Rolle | 180—7 |
| 3,082,836 | 3/1963 | Billman | 180—7 |
| 3,097,718 | 7/1963 | Jay et al. | 180—7 |

(Other references on following page)

UNITED STATES PATENTS

| | | | |
|---|---|---|---|
| 3,164,911 | 1/1965 | Vaughen | 180—7 X |
| 3,172,494 | 3/1965 | Cockerell | 180—7 |

FOREIGN PATENTS 860,781　2/1961　Great Britain.

OTHER REFERENCES

Popular Mechanics, May 1961, page 77, "Hovering Wheelbarrow."

MILTON BUCHLER, *Primary Examiner.*
PHILIP ARNOLD, *Examiner.*
R. M. WOHLFARTH, L. C. HALL, *Assistant Examiners.*